United States Patent [19]

Paget

[11] 4,402,342
[45] Sep. 6, 1983

[54] COMPRESSOR VALVE

[76] Inventor: Wm. W. Paget, P.O. Box 1335, Elizabethtown, N.C. 28337

[21] Appl. No.: 312,325

[22] Filed: Oct. 16, 1981

[51] Int. Cl.³ .............................. F16K 15/14
[52] U.S. Cl. .......................... 137/512.15; 137/516.13
[58] Field of Search ...................... 137/512.15, 516.11, 137/516.13, 516.15, 516.17, 516.19, 516.21, 516.23, 854

[56] References Cited

U.S. PATENT DOCUMENTS

| 921,892 | 5/1909 | Rogler | 137/516.13 |
| 3,286,727 | 11/1966 | Kehler | 137/516.13 |

FOREIGN PATENT DOCUMENTS

| 1311722 | 10/1962 | France | 137/516.13 |
| 24938 | of 1909 | United Kingdom | 137/516.13 |

*Primary Examiner*—Robert G. Nilson
*Attorney, Agent, or Firm*—Young & Thompson

[57] ABSTRACT

A compressor valve assembly for use with a gas compressor, comprises a valve seat, a valve guard, and between the valve seat and the valve guard a valve seat plate and a resilient valve member disposed side-by-side. These members are apertured with the apertures of the valve member and valve seat plate out of registry with each other, the valve member being adapted to flex toward and away from the seat plate thereby to open and close the apertures through the seat plate. The valve member has a plurality of radially extending arms that interconnect the central portion of the valve member with a peripheral portion of the valve member, and generally radially extending slots through the valve member bordering these arms. The valve seat plate has radially extending imperforate portions that underlie these slots, thereby to close the slots in the closed position of the valve assembly so as to prevent leakage of gas through those portions of the slots that overlie annular grooves in the valve seat. The valve seat plate also has radially extending slots therethrough that underlie the arms of the valve member, whereby those arms open and close the last-named slots as the valve member flexes, so that those arms add to the effective area of the valve.

2 Claims, 7 Drawing Figures

U.S. Patent   Sep. 6, 1983   4,402,342
FIG.1
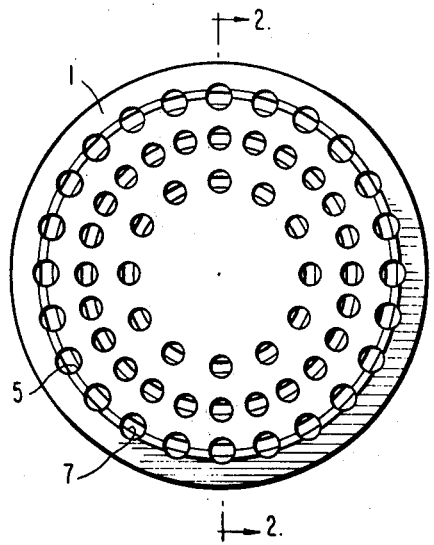
FIG.2
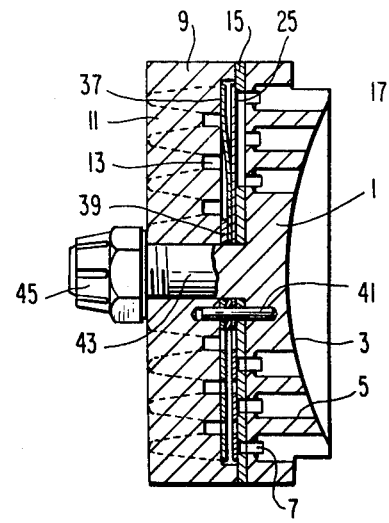
FIG.3
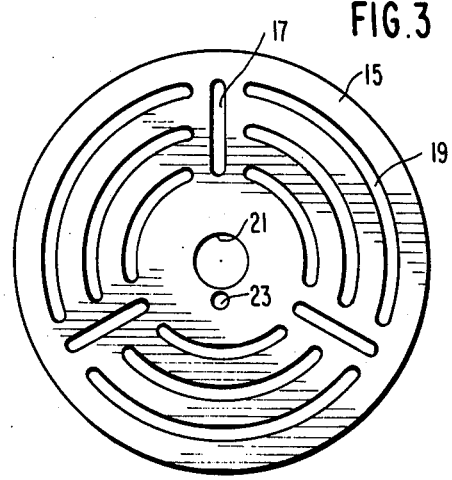
FIG.4
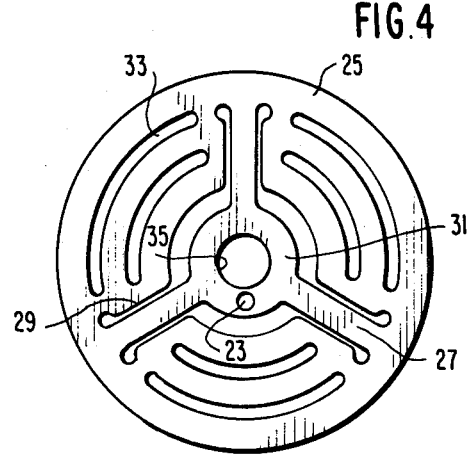
FIG.5
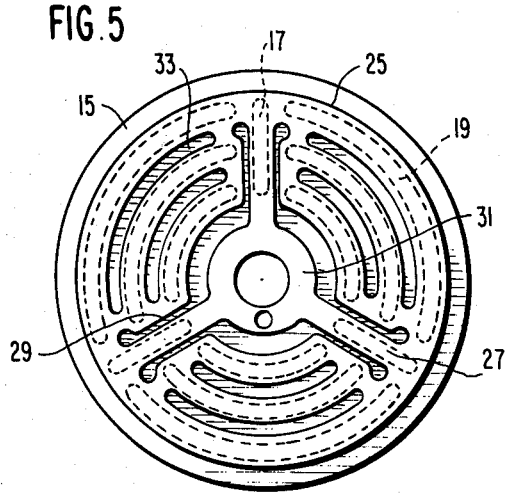
FIG.6
INLET VALVE ARRANGEMENT
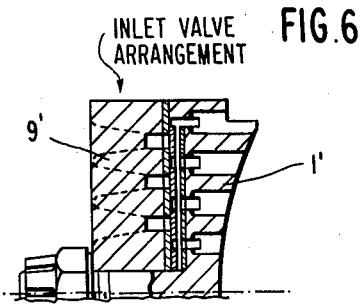
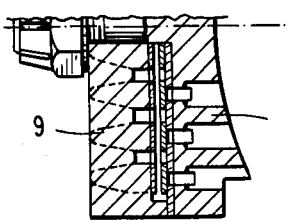
FIG.7
DISCHARGE VALVE ARRANGEMENT

COMPRESSOR VALVE

The present invention relates to compressor valves, more particularly of the type in which the valve member is in the form of a flexible reed.

Such valves are of course well known and comprise a valve guard and a valve seat between which the reed is retained from oscillation into and out of the plane it occupies in its unstressed condition. The valve guard and valve seat are provided with apertures therethrough; and the valve can be either of the discharge valve type or of the inlet valve type, depending on whether the corresponding apertures in the reed are in registry with those of the valve guard or those of the valve seat, respectively.

In such valves, it is known to provide a series of concentric annular grooves in the surface of the valve seat which confronts the valve member, the bottoms of these grooves communicating with the cylinder bore through the apertures that traverse the valve seat. It is also known to impart to the flexible valve member the general form of a spoked wheel having radial arms interconnecting a central portion of the valve member with the periphery thereof, the arms being spaced from adjacent portions of the valve member by generally radially extending slots. However, these generally radially extending slots extend between the annular grooves in the valve seat, and so give rise to leakage where the slots and grooves intersect.

It is accordingly an object of the present invention to prevent such leakage in a valve of this type.

Another object of the present invention is to enable the aforementioned radial arms on the valve member, to perform themselves a valving function, thereby increasing the flow passsage area through the valve assembly.

Briefly, the objects of the invention are achieved by providing, between the valve member and the valve seat, a valve seat plate having apertures therethrough that register with its associated valve seat and that has radially extending portions that register with and so close the radially extending slots in the valve member. Preferably, those radially extending portions of the valve seat plate are also apertured in registry with the radially extending arms of the valve member, thereby to impart to those arms the unique dual function, not only of serving as the means for imparting sufficient flexibility to the valve member, but also of themselves serving as valving members and so increasing the flow passage area through the valve assembly.

These and other objects, features and advantages of the present invention will become apparent from a consideration of the following description, taken in connection with the accompanying drawing, in which:

FIG. 1 is an elevational view of a valve assembly according to the present invention, showing the side exposed to the piston of a gas compressor;

FIG. 2 is a cross-sectional view on the line 2—2 of FIG. 1;

FIG. 3 is an elevational view of the valve seat plate;

FIG. 4 is an elevational view of the valve member;

FIG. 5 is a view of the valve member and valve seat plate superimposed, showing the valving relationship therebetween;

FIG. 6 is a view similar to FIG. 2, but showing the upper half the valve assembly of the present invention arranged as an inlet valve; and FIG. 7 is a view similar to FIG. 6 but showing the lower half of the valve assembly of the present invention arranged as an outlet valve.

Referring now to the drawing in greater detail, and first to FIGS. 1 and 2 thereof, there is shown a valve assembly for a gas compressor, according to the present invention, comprising a circular valve seat 1 having a spherically concave surface 3 thereon on the side that confronts the piston of a gas compressor. Such a compressor can be entirely conventional, or can be of the type disclosed in my copending application entitled "Gas Compressor With Spherical Piston Surfaces", filed under even date herewith, the disclosure of which is incorporated herein by reference.

Valve seat 1 has a number of drilled openings 5 passing therethrough, which terminate at their inner ends in a series of annular grooves 7 machined in the surface of valve seat 1 which is opposite spheroidal surface 3.

On the other side of valve seat 1 is coaxially disposed a circular valve guard 9 having openings 11 therethrough that communicate at their inner ends with annular grooves 13 machined in the inner face of guard 9.

Releasably clamped between seat 1 and guard 9, is a valve seat plate 15 best seen in FIG. 3. As will be there seen, seat plate 15 is characterized by a plurality of radially extending slots 17 therethrough, between which are disposed concentric arcuate through slots 19. A central hole 21 provides for the assembly of seat plate 15; while a locator hole 23 ensures its correctly rotated position.

The valve member itself is shown in FIG. 4, and can be of conventional configuration, namely, of thin flat resilient metal, with a plurality of radial arms 27 delimited on both sides by generally radially extending slots 29, joining an annular central portion 31 of the valve member with the periphery of the valve member. Between the arms 27, the sheet metal material of the valve member is larely intact, apart from arcuate through slots 33. A central opening 35 provides for the assembly of valve member 25; while the same type of hole 23 as in FIG. 3 provides for its correct positioning.

A valve backing plate 37 is provided, which is exactly the same size and shape as valve member 25, apart from two features:

1. Backing plate 37 is about twice as thick as valve member 25 and is of a precipitation-hardening stainless steel; and 2. Backing plate 37 is slightly undulant in its undeformed condition; whereas valve member 25 is flat in its undeformed condition. Specifically, as is conventional, backing plate 37 has portions midway between the arms 27, that are parallel to but spaced from the plane of what, on backing plate 37, corresponds to the central portion 31 of valve member 25, the other portions of backing plate 37 being gently curved between those spaced parallel planes, as best seen in FIG. 2. Backing plate 37 is, as is well known, preformed to such shape, in order to conform as closely as possible to the shape of valve member 25 in the open position thereof.

A spacer washer 39, whose thickness determines the actual lift of the valve, is clamped in assembled relationship with the parts thus far described; and a locator pin 41 traverses the holes 23 and dead ends in blind holes in valve seat 1 and valve guard 9, thereby to ensure that the parts in assembled relationship are in correctly rotated position relative to each other. A central stud 43 on valve seat 1 extends through the central holes of the other parts; and a nut 45 releasably clamps the valve assembly together.

FIG. 5 shows the superposed relationship of valve seat plate 15 and valve member 25. As is evident, the slots 17 of seat plate 15 underlie the arms 27 and are spaced from the slots 29 of valve member 25. The slots 19 and 33, as is conventional, do not register with each other.

The borders of the slots 17 of seat plate 15 constitute radially extending portions of seat plate 15 that completely close the slots 29 in valve member 25 and so prevent leakage at what would otherwise be the intersection of slots 29 with grooves 7 in valve seat 1; and this is a very important feature of the present invention.

Another very important feature of the present invention, is that the arms 27 of valve member 25 selectively open and close the slots 17 of seat plate 15, so that for the first time in this art these radial arms 27 serve themselves as valve members, in addition to their previously known function of interconnecting the periphery of the valve member with its hub.

The configuration of the valve assembly of FIG. 2 is that of a discharge valve. However, the present invention is equally applicable to an inlet valve. FIG. 6 shows the minor rearrangements that are needed, the upper half of FIG. 6 showing the inlet valve arrangement and the lower half of FIG. 6 showing the discharge valve arrangement. In the discharge valve arrangement, the seat plate 15 rests flat against the member 1; whilst the valve member and backing plate 37 are disposed in a shallow recess in member 9 with the valve member 25 next to the seat plate 15. But in the inlet valve arrangement, by contrast, the arrangement is reversed and the valve seat plate 15 is disposed flat against member 9'; whilst the valve member 25 and backing plate 37 are disposed in a shallow recess in the member 1', again with the valve member next to the seat plate. Of course, in both cases, the apertures through the backing plate register both with those through the valve member and those through the valve guard that is next to the backing plate; whilst the apertures through the seat plate register with those through the valve seat that is next to it, but are entirely out of registry with those through the valve member.

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In a gas compressor valve assembly comprising a valve seat, a valve guard, and between the valve seat and the valve guard a valve seat plate and a resilient valve member disposed side by side, the valve seat and valve guard and seat plate and valve member all having apertures therethrough with the apertures of the valve member and valve seat plate out of registry with each other, the valve seat having annular concentric grooves that underlie the valve seat plate, the valve member being adapted to flex toward and away from the seat plate thereby to open and close the apertures through the seat plate, the valve member having a plurality of radial arms that interconnect the central portion of the valve member with a peripheral portion of the valve member, and generally radial slots through the valve member bordering said arms; the improvement in which the valve seat plate has radial imperforate portions that underlie said slots thereby to close the slots in the closed position of the valve assembly, said valve seat plate having apertures therethrough that underlie said arms, whereby said arms open and close the last-named apertures as the valve member flexes.

2. A valve assembly as claimed in claim 1, the last named apertures being radial slots.

* * * * *